United States Patent

Frisch

[11] Patent Number: 5,513,674
[45] Date of Patent: May 7, 1996

[54] SEALING ARRANGEMENT

[75] Inventor: Herbert Frisch, Vienna, Austria

[73] Assignee: Hoerbiger Ventilwerke Aktiengesellschaft, Vienna, Austria

[21] Appl. No.: 237,174

[22] Filed: May 3, 1994

[30] Foreign Application Priority Data

May 5, 1993 [AT] Austria .................................. 875/93

[51] Int. Cl.⁶ .............................. F15B 13/04; F16J 15/32
[52] U.S. Cl. .................... 137/625.69; 251/324; 277/186; 277/189
[58] Field of Search ...................... 277/50, 167.3, 277/165, 168, 173, 177, 178, 189, 184, 186, 166; 251/214, 324; 137/248, 249, 384, 625.66, 625.68, 625.69

[56] References Cited

U.S. PATENT DOCUMENTS 3,909,017  9/1955  Engstrom ......................... 277/168
4,491,155  1/1985  Meyer et al. .................... 137/625.69
5,171,025  12/1992 Stoll et al. ........................... 277/189
5,190,078  3/1993  Stoll et al. ..................... 137/625.69
5,263,404  11/1993 Gaucher et al. ..................... 277/189

Primary Examiner—Daniel G. DePumpo
Attorney, Agent, or Firm—Watson Cole Steven Davis

[57] ABSTRACT

A sealing ring (10) includes an outer sealing region (11) with a sealing edge (18) which rests in the installed state against the surface region to be sealed, and a holder region (12) which is situated within the sealing region (11). To prevent or render the pulling out of the sealing ring (10) from the corresponding groove-shaped recess (13) more difficult, the groove-shaped recess (13) includes at least one offset holding shoulder (16), and the holding region of the sealing ring (10) includes at least one corresponding holding edge (17), which in the installed state of the sealing ring (10) holds the sealing ring shape-lockingly like a barb.

7 Claims, 1 Drawing Sheet

SEALING ARRANGEMENT

BACKGROUND OF THE INVENTION

1. Field of the Invention

The invention relates to a sealing arrangement, in particular for a metering piston of a pneumatic valve, including a sealing ring which is made at least in part of an elastic material and which exhibits an essentially discoid, outer sealing region with a sealing edge that rests in an installed state against the surface region to be sealed, and a holding region which is arranged under partial pretension in a corresponding groove-shaped recess of the metering piston.

2. The Prior Art

There exist for various uses devices, for example, pneumatic valves, whose metering pistons are sealed with elastic seals. These seals can be mounted either on the metering piston itself or on the housing and, thus, also move either with each motion of the metering piston or remain stationary in the installation position in the housing. Especially for sealing arrangements of the aforementioned kind where the sealing ring is mounted on the metering piston, there exist sealing rings which lie like O-rings in corresponding grooves of the metering piston. At the same time there exist various shapes for the cross section of the sealing rings, whereby, however, substantially discoid sealing rings are preferably used.

These sealing arrangements have in particular the drawback that an air current flowing by, as is always the case in switching valves, can pull out the sealing ring, an event which one strives to prevent frequently by means of a sliding ring, pulled externally over the sealing ring, or a special operating edge construction, a solution that is associated, however, with a more complicated and, thus, more expensive construction.

Through modification of the aforementioned washer seals there also exist sealing arrangements where the sealing ring is not simply embedded in grooves of the metering piston, but rather where the piston is assembled from individual parts with sealing rings lying in between and a connecting piece at the same time that the sealing arrangement or the sealing ring is assembled, whereby radially oriented seams at the axial surfaces of the sealing rings are inserted into the corresponding grooves of the spacers. This holding at the seams in the vicinity of the sealing diameter does prevent the sealing ring from being pulled out of the groove, as described above, but simultaneously the construction of the piston and thus the assembly becomes more complicated due to the necessary division.

SUMMARY OF THE INVENTION

The object of the invention is to provide an improved sealing arrangement of the aforementioned kind wherein the cited drawbacks of such known or similar constructions are avoided and wherein the overall construction of the sealing arrangement or the metering piston equipped with the sealing arrangement or the like is simplified, in particular while preventing in a reliable manner the sealing ring from being pulled out.

The problem with a sealing arrangement of the aforementioned kind is solved according to the invention in that the groove-shaped recess exhibits at least on one side a holding shoulder which recedes from a region which has a smaller width and is situated closer to the sealing edge, to a region which has a larger width and is situated further away from the sealing edge; and in that the holding region of the sealing ring exhibits a corresponding holding edge which extends at least in part over the circumference and which engages the sealing ring at the offset holding shoulder in the groove-shaped recess when the sealing ring is in the installed state. Following installation of the sealing ring into the groove-shaped recess, whereby in the holding region of the sealing ring— respect to the position of the sealing edge—the holding edge comes to rest behind the offset holding shoulder, the result is, thus, a semi-shape-locking connection between holding shoulder and holding edge so that the sealing ring can be removed (if at all) from the groove-shaped recess only by overcoming or by disengaging this shape-locking connection. The securing of the sealing ring in the groove-shaped recess relative to the force required to overcome it is easy to influence or vary by means of the design, shaping and dimensioning of the offset holding shoulder in the groove-shaped recess, on the one hand, and the holding edge in the holding region of the sealing ring, on the other hand, so that the entire band width between merely a mild securing that allows the sealing ring to be replaced, as desired, up to a permanent securing that can be eliminated only by destroying the sealing ring can be covered with the simplest modifications.

In a preferred embodiment of the invention the offset holding shoulder is formed by the side surface of a lateral notch in the peripheral groove-shaped recess, the surface being closer to the sealing edge. This feature facilitates the manufacture of the component carrying the groove-shaped holding region (thus here preferably the metering piston; however, the groove-shaped recess with the sealing ring could also be provided, as described above, at an external, stationary housing region) since the lateral notch can also be cut quite easily and simply, for example, at the same time the groove-shaped recess is cut away, provided the depth of the notch does not become too large with respect to the side wall of the groove-shaped recess. With regard to a lateral notch that is still simple to produce, for example, by machining, its width should not be more than about 10%–20% of the width of the groove-shaped recess. At the same time, it is immaterial whether such a lateral notch in the groove-shaped recess is provided in the vicinity of the groove bottom or at some other point of the groove height.

According to another embodiment of the invention the offset holding shoulder is formed by that side of a peripheral constriction of the groove-shaped recess that faces away from the sealing edge, whereby the amount of the holding force can be affected once again in the simple manner described above through the design and dimensions of this constriction.

The holding edge of the sealing ring can be designed in an especially preferred embodiment of the invention at a peripheral, lip-shaped expansion of the sealing ring in the holding region, whereby this lip-shaped expansion can be oriented especially in the shape of a barb with the tip in the direction away from the bottom of the groove-shaped recess, a feature that allows, on the one hand, the sealing ring to be readily inserted into the groove-shaped recess and, on the other hand, the inserted sealing ring to be held reliably by means of a shape-lock. Provided the outer ends of the lip-shaped expansion of the sealing ring, whose cross section stands like a barb in the direction of the sealing edge, rests as the sealing lips against the respective regions of the groove-shaped recess, a pneumatic assist of the mechanical holding effect is obtained, whereby the seal cannot be undermined and pushed out by the pressure to be sealed.

In another advantageous embodiment of the invention the sealing ring between sealing region and holding region includes a side peripheral bulge, which makes it easier to press in the holding region and the holding edge behind the holding shoulder. The material that is missing at the place of this circumferential indentation allows the material, which is to be compressed in the region of the holding edge when the sealing ring is inserted into the groove-shaped recess, to deflect slightly, a feature that facilitates handling and/or assembly.

The invention will be explained in the following with reference to the embodiments that are depicted schematically in the drawings.

DETAILED DESCRIPTION OF THE PREFERRED EMBODIMENTS

Figure 1:
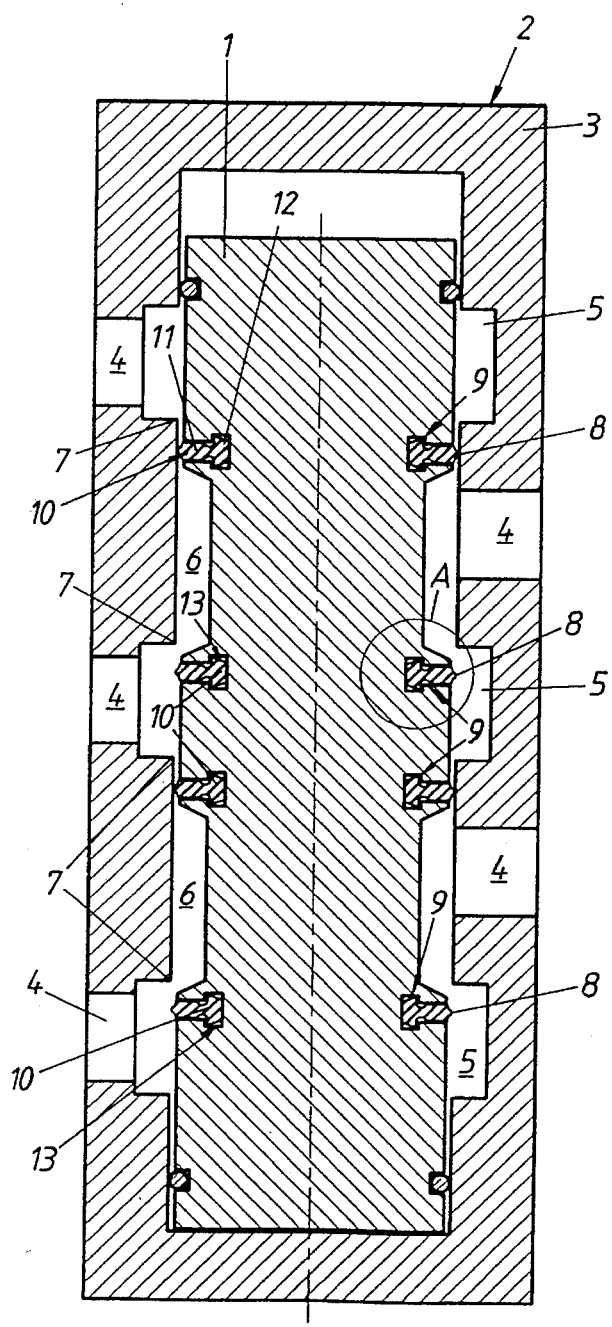
FIG. 1 is a cross sectional longitudinal view of a pneumatic valve in the region of the metering piston.

The metering piston 1 shown schematically in FIG. 1 is a part of a pneumatic valve 2 whose housing 3 includes different ports 4 which are controlled in a manner that is of no further interest here by way of control chambers 5 or the control edges 7 separating the intermediate regions 6, and sealing edges 8 which interact with the sealing edges.

The sealing arrangements 9, relating to the sealing edges 8, include a sealing ring 10, which is made of a material that is at least in part elastic and which has an outer, substantially disk-shaped sealing region 11, with the sealing edge 8 resting against the housing 3 to be sealed in the installed state, and a holding region 12 situated concentrically within the sealing region 11. The entire sealing ring 10 is held in a manner to be described below by means of the holding region or its design under partial pretension in a corresponding groove-shaped recess 13 in the metering piston 1, so that the sealing ring cannot be pulled out of the groove-shaped recess 13 by means of an air current flowing by at the sealing edge 8—as is always the case in switching valves.

Figure 3:
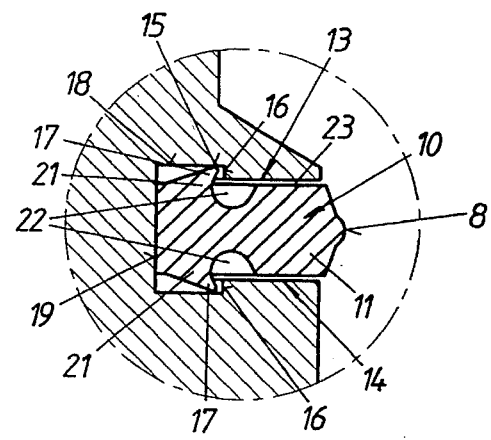

The groove-shaped recess 13 defines on both sides respectively a holding shoulder 16, which recedes from a region 14 which has a smaller width and is situated closer to the sealing edges 8, to a region 15 which has a larger width and is situated farther away from the sealing edge 8, as shown especially in the enlargement of detail A in FIG. 3. Similarly, the holding region 12 of the sealing ring 10 exhibits here on both sides a corresponding holding edge 17 which extends over the circumference and which in the installed state of the sealing ring 10 ensures in an obvious manner that the sealing ring will not be pulled out at the offset holding shoulder 16 in the groove-shaped recess 13.

Figure 4:
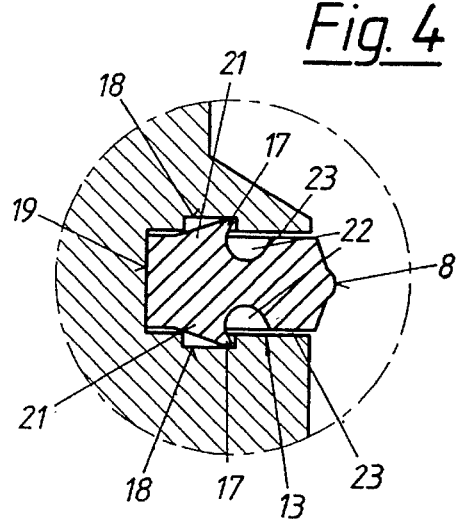

According to FIGS. 3 and 4, the offset holding shoulder 16 is formed by that side surface of a lateral notch 18 that is situated closer to the sealing edge 8, in the circumferential groove-shaped design 13, whereby, according to FIG. 3, the lateral notches 18 are designed directly at the groove bottom 19, whereas, according to FIG. 4, they lie somewhat further toward the outside at a distance from the groove bottom 19.

Figure 2:
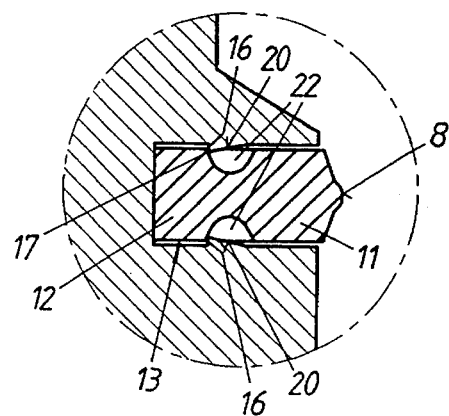
FIGS. 2–4 are enlarged views of different embodiments of the region denoted as A in FIG. 1.

In contrast, in the design according to FIG. 2, the offset holding shoulders 16 are formed by that side of a circumferential constriction 20 of the groove-shaped recess 13 that faces away from the sealing edge 8.

In the embodiments according to FIGS. 3 and 4, the holding edge 17 of the sealing ring 10 is designed with a circumferential, lip-shaped expansion 21 of the sealing ring 10 in the holding region 12, whereas in the embodiment according to FIG. 2 the sealing ring 10 in the holding region 12 has in principle the same thickness as in the sealing region 11, whereby the holding edges 17 are designed here at the left end (in the drawing) of an indentation 22 of the sealing ring 10 between sealing region 11 and holding region 12.

In the embodiments according to FIGS. 3 and 4, such an indentation 22 is also provided, thus facilitating the procedure of pressing in the holding region 12 and the holding edge 17 behind the holding shoulder 16, since the material of the holding region 12 that compresses during operation can escape up to a certain degree.

It is also obvious from FIGS. 3 and 4 that the holding edges 17 also act as sealing edges and are pressed even more firmly against the corresponding surfaces of the respective notch 18, facilitated by means of the pressure, which may or may not act via the gap 23 (exaggerated in the drawing), so that the pressure to be sealed cannot migrate under the sealing ring and thus press it out of the groove-shaped recess 13.

It is self-evident that the strength of the securing of the sealing ring 10 in the groove-shaped recess 13 can be readily and directly influenced by simply varying the shape, configuration and dimensions of the elements defining, on the one hand, the holding shoulder 16, and, on the other hand, the holding edge 17.

At variance with the illustrated and discussed arrangement of the sealing rings 10 at the metering piston 1, which can be moved in the housing, the sealing rings could also be arranged naturally in the reverse, viz. also stationarily in the region of the metering edges 7 at the housing 3 and seal in this manner the piston, which is movable in the housing. The described elements and their arrangement could be transferred in essence simply by the same token to such an arrangement.

I claim:

1. A pneumatic valve comprising a valve body with an interior wall defining an interior chamber and a metering piston movable within said interior chamber and defining an exterior surface, one of said interior wall and said exterior surface providing a groove-shaped recess and including a sealing ring therein, said groove-shaped recess in cross-section defining a mouth, a bottom, opposed shoulders located between said mouth and said bottom, first opposed lateral walls that extend from said mouth to said shoulder and second opposed lateral walls that extend from said shoulders toward said bottom, said second opposed lateral walls being spaced by a width which is 10 to 20% larger than a width spacing said opposed shoulders, and said sealing ring being made at least in part of an elastic material and defining in cross-section a holding region at a first end, an opposite second end portion defining a sealing edge, and a holding edge therebetween, said holding region fitting between said second lateral walls of said recess, said holding edge contacting one of said opposed shoulders of said recess, and said second end portion extending between said first opposed lateral walls and outwardly of said mouth so as to contact a second of said interior wall and said exterior surface, an end of said holding region facing said bottom of said groove-shaped recess defining a width which is no greater than a width of said second end portion.

2. The combination according to claim 1, wherein said sealing ring defines two holding edges between said holding region and second end portion thereof.

3. The combination according to claim 1, wherein said groove-shaped recess in cross-section includes third opposed lateral walls extending between said second opposed lateral walls and said bottom, said first, second and third opposed lateral walls defining opposed notches, connecting portions between the first and second opposed lateral walls constituting said opposed shoulders.

4. The combination according to claim 1, wherein said first and second opposed lateral walls of said groove-shaped recess define a step therebetween which constitutes said opposed shoulders.

5. The combination according to claim 1, wherein said holding edge of said sealing ring is a protruding lip.

6. The combination according to claim 1, wherein said sealing ring includes a lateral indentation between the holding edge and the second end portion to facilitate insertion of the sealing ring in the groove-shaped recess.

7. The combination according to claim 1, wherein said groove-shaped recess is located in the exterior surface of the metering piston.

* * * * *